Dec. 19, 1961 G. A. WAHLMARK 3,013,411
GEAR TYPE CONSTANT VELOCITY JOINT
Filed April 12, 1960 4 Sheets-Sheet 1

INVENTOR.
Gunnar A. Wahlmark
BY
Byron, Hume, Green & Clement
Attys.

Dec. 19, 1961  G. A. WAHLMARK  3,013,411
GEAR TYPE CONSTANT VELOCITY JOINT
Filed April 12, 1960  4 Sheets-Sheet 2

INVENTOR.
Gunnar A. Wahlmark
BY
Byron, Hume, Groen & Clement
Attys.

Dec. 19, 1961  G. A. WAHLMARK  3,013,411
GEAR TYPE CONSTANT VELOCITY JOINT
Filed April 12, 1960  4 Sheets-Sheet 3

INVENTOR.
Gunnar A Wahlmark
BY
Attys.

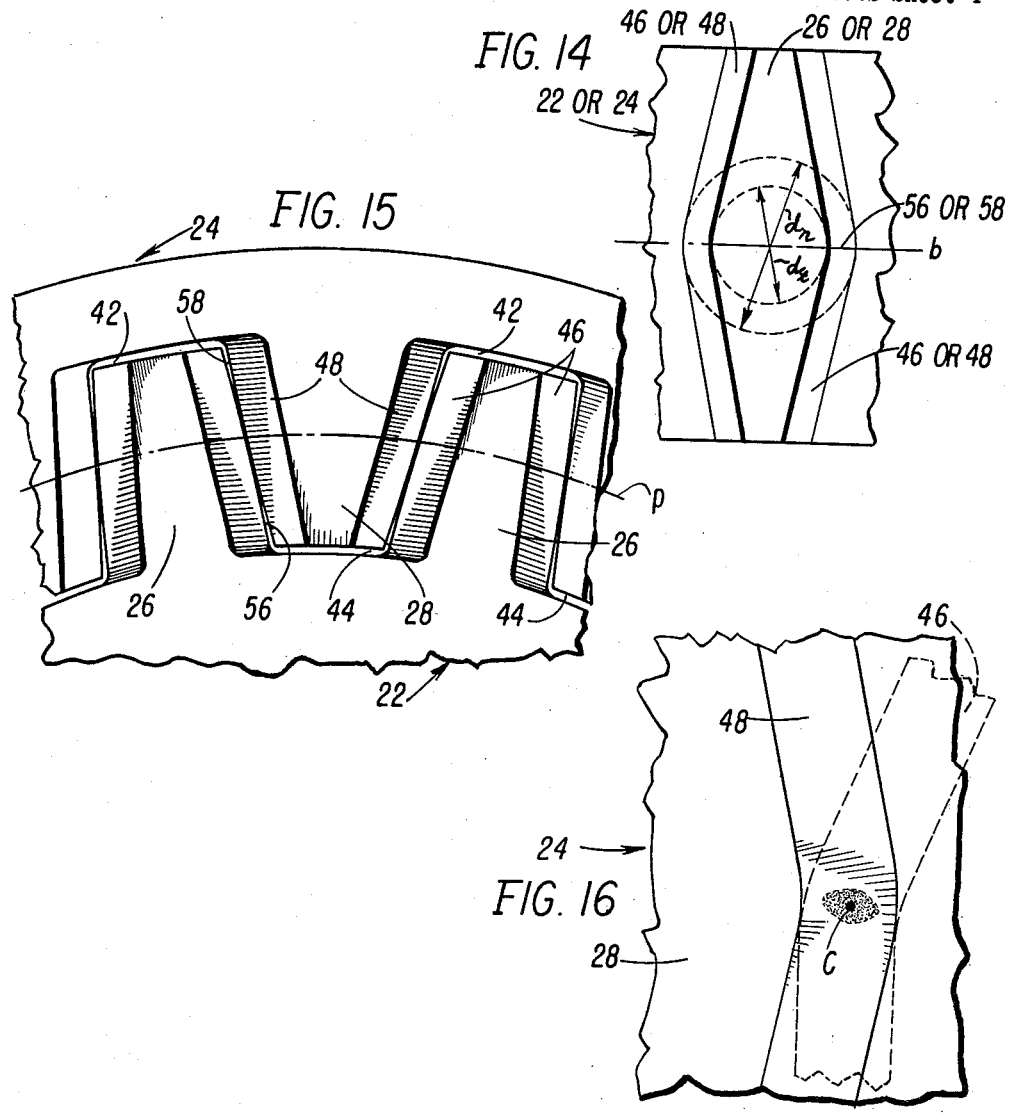

United States Patent Office 3,013,411
Patented Dec. 19, 1961

3,013,411
GEAR TYPE CONSTANT VELOCITY JOINT
Gunnar A. Wahlmark, 211 S. Rockford Ave.,
Rockford, Ill.
Filed Apr. 12, 1960, Ser. No. 21,761
19 Claims. (Cl. 64—21)

This invention relates to a gear type constant velocity universal joint. More particularly, the invention relates to a universal joint employing an externally toothed member in universal drive engagement with an internally toothed member in a manner such that constant velocity drive is achieved between the members regardless of the angularity of the axes up to a maximum design angle.

In order to provide a drive between angularly disposed members, a universal joint must be employed. The type of universal joint in most common usage is the Cardan type. While Cardan joints do provide universal drive between members having angularly disposed axes, it is well known that Cardan joints are subject to a very serious weakness in that such joints provide fluctuations in rotational speed of the driven member even though the drive member is rotated a constant velocity. These speed fluctuations of the driven member, manifested by two accelerations and decelerations of the driven member for every 360° of rotation of the drive member, become increasingly serious as the angularity between the members is increased. For example, at 10° shaft angularity, the driven shaft speed varies approximately 3% while at 30° shaft angularity the driven shaft speed varies approximately 29%. The speed fluctuations are the result of variations in distance from the axis of the drive shaft to the points of drive contact with the driven shaft, in other words, variations in length of the drive moment arm.

At relatively small shaft angularities and moderate rotational speeds, Cardan type universal joints operate satisfactorily. However, when either shaft angularity or rotational speed is increased substantially, the speed fluctuations encountered in Cardan joints render them unacceptable.

Accordingly, in the past two or three decades, various efforts have been made to provide load carrying universal joints which achieve constant velocity drive from the drive member to the driven member regardless of the angularity between the axes of the members. A number of satisfactory constant velocity universal joints have been constructed, and examples can be seen in my prior invention entitled "Constant Speed Drive," Patent No. 2,908,151, dated October 13, 1959, and also in my prior invention entitled "Constant Velocity Joint," Patent No. 2,910,845, dated November 3, 1959. While such joints have performed satisfactorily, they are unfortunately somewhat more complicated and more difficult to manufacture than Cardan type universal joints. Furthermore, the load carrying capacity of many prior art constant velocity joints is significantly less than that of Cardan joints of comparable size.

The present invention covers a load carrying constant velocity universal joint which is more simple and less expensive to manufacture than a Cardan joint and which provides a load carrying capacity at least equal to that of a comparable size Cardan joint.

Accordingly, it is an object of the present invention to provide an improved and simplified constant velocity universal joint.

Another object of the invention is to provide a load carrying constant velocity joint employing only two members.

A further object of the invention is to provide a load carrying constant velocity universal joint which employs no movable parts other than the two members being universally joined.

Still another object of the present invention is to provide a constant velocity universal joint, the parts of which can be readily manufactured on standard gear cutting machinery.

A still further object of the invention is to provide a constant velocity universal joint which can be readily operated at extreme angularity between the axes of the drive and driven members.

An additional object of the invention is to provide a load carrying constant velocity universal joint in which the load carrying capacity of the joint is at least as great at maximum angle as at smaller angles.

An important object of the present invention is to provide a constant velocity universal joint in which low relative speed is provided between the load carrying elements in engagement.

Another object of the invention is to provide a constant velocity universal joint in which there is no acceleration or deceleration of auxiliary members to limit the operational speeds.

A further object of the invention is to provide an improved constant velocity universal joint in which the joint pivot axis may be placed in any position between the point of intersection of the axes of the joint members and the pitch circle.

A general object is to provide a load carrying constant velocity joint which has at least the load carrying capacity of a comparable size Cardan joint and which is more simple and less expensive to manufacture.

Other objects, features and advantages will be apparent from the following detailed description taken in conjunction with the accompanying drawings in which:

FIGURE 14 is a fragmentary view of one tooth of a joint according to the present invention showing the radii formed between the engaging surfaces, shown on a scale substantially enlarged over that of FIGURES 10–13.

FIGURE 15 is an end elevational view showing the drive and driven members of the joint of the present invention engaged at zero angle in order to illustrate crowning of the teeth for providing engagement at a fixed pitch diameter.

FIGURE 16 is a highly magnified fragmentary view of the engagement area of the engaged teeth shown in FIGURE 13.

Figure 1:
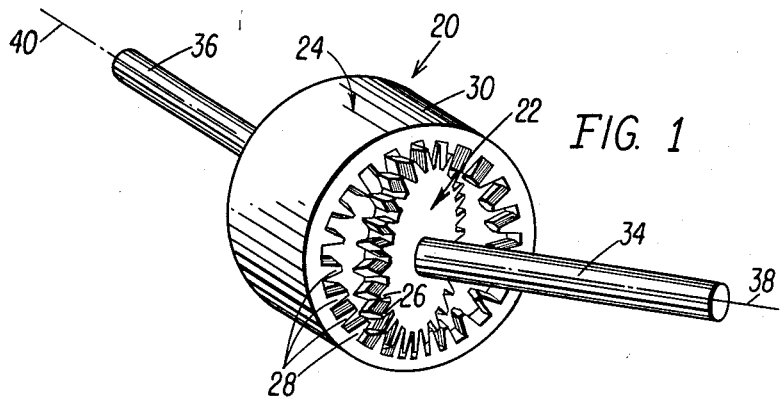
FIGURE 1 is a perspective view of a constant velocity universal joint according to the present invention shown somewhat schematically.

The constant velocity universal joint according to the present invention is generally designated by the reference numeral 20 and includes an externally toothed member 22, which is conveniently referred to as the drive member, universally engaged with an internally toothed member 24, conveniently referred to as the driven member. It will be understood that in spite of the terminology, either member may be the drive member.

Figure 8:
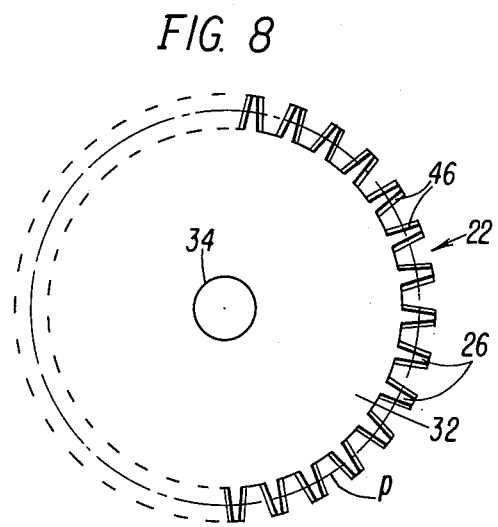
FIGURE 8 is an end elevational view of the externally toothed member shown in FIGURE 7.
Figure 7:
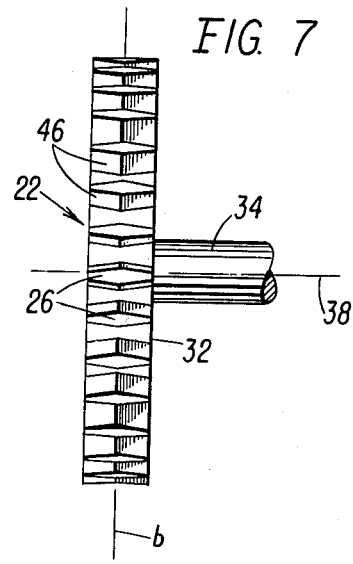
FIGURE 7 is an enlarged side elevational view of the externally toothed member of the universal joint of FIGURE 1, on the same scale as FIGURE 6.
Figure 9:
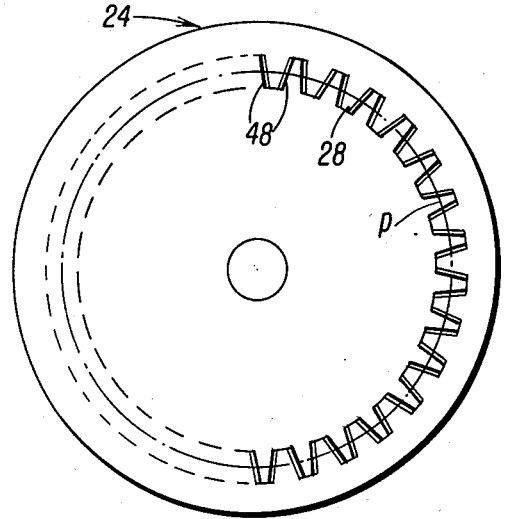
FIGURE 9 is an end elevational view of the internally toothed member of the joint, on the same scale as FIGURES 6, 7 and 8.

The drive member 22 is provided with external integral drive teeth 26 which are in mesh with internal integral drive teeth 28 formed in a bell portion 30 of the driven member 24. The drive teeth 26 and 28 are so formed that their drive engagement occurs substantially at a given radial location or locations which define a pitch circle or pitch diameter "$p$" for each of the members (FIGURES 8, 9 and 15). A hub 32 of the drive member is fixedly secured in any manner to an axially disposed drive shaft 34. A driven shaft 36 of the driven member 24 is axially fixedly secured to the bell portion 30 of the driven member 24. The members and their integral teeth are formed of a hard tough material such as high grade steel, suitably hardened. The shafts 34 and 36 may be rotatably carried in bearings of any suitable design (not shown) in order to maintain any desired angularity between the shafts. Either or both of the shaft support bearings may be pivotally disposed in any suitable manner (not shown) where the shaft angularity is to be varied.

Figure 2:
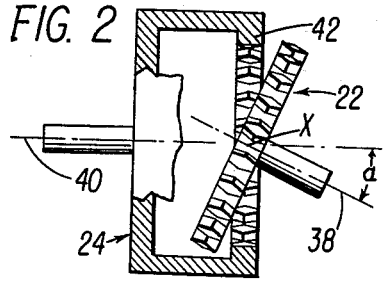
FIGURE 2 is a side elevational view of the universal joint of FIGURE 1 with the internally toothed member shown partly in section and illustrating the joint members in driving engagement at maximum angle with the joint pivot axis located at the point of intersection of the joint member axes.
Figure 3:
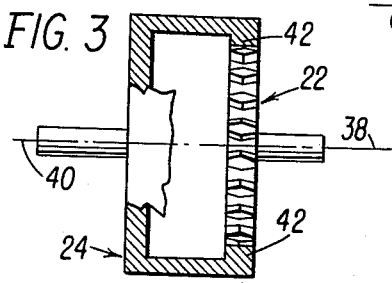
FIGURE 3 is a side elevational view similar to FIGURE 2 with the internally toothed member partly in section and with the joint members engaged at zero angle.

The rotational axis of the drive member 22 is designated by the reference numeral 38 while the rotational axis of the driven member 24 is designated by the reference numeral 40. The joint is constructed to provide constant velocity universal drive between the joint members at any shaft angularity between zero degrees, as shown in FIGURE 3, up to a maximum angle "$a$," as illustrated in FIGURE 2. For purposes of illustration, the maximum angle "$a$" shown in FIGURE 2 is approximately 24°, but it will be seen from the subsequent description that the joint may be constructed for operation up to larger maximum angles.

Figure 4:
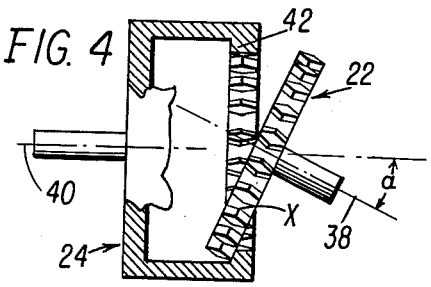
FIGURE 4 is a side elevational view similar to FIGURE 2 with the internally toothed member partly in section but with the joint pivot axis partly displaced in the direction of the pitch circle.
Figure 5:
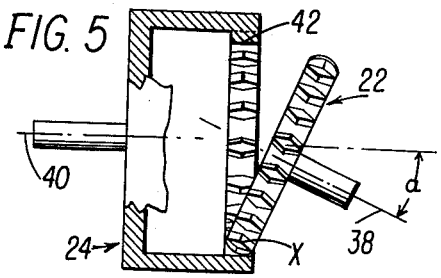
FIGURE 5 is a side elevational view similar to FIGURE 2 with the internally toothed member partly in section but showing the joint pivot axis at the pitch circle.
Figure 6:
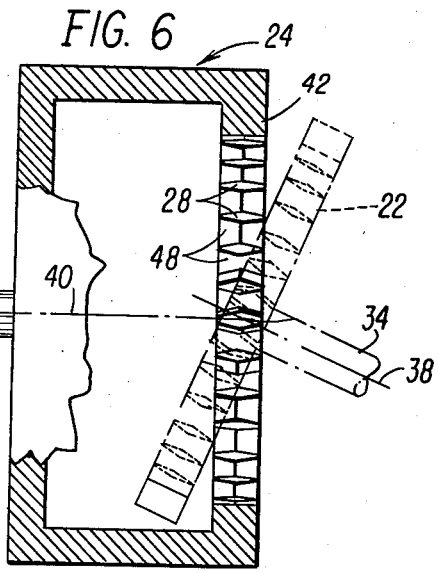
FIGURE 6 is an enlarged side elevational view of the joint of the present invention wtih the externally toothed member shown in phantom lines and with the internally toothed member partly in section in order to better illustrate the engaging action.

In a typical joint arrangement as illustrated in FIGURES 1, 2 and 6, the members 22 and 24 are arranged for pivoting about a joint pivot axis "$x$" which is perpendicular to the plane defined by the rotational axes 38 and 40 and intersects this plane at the point of intersection of these rotational axes. However, the construction and configuration of the drive teeth 26 and 28 is such that the joint pivot axis "$x$" may be displaced from the rotational axes 38 and 40 as illustrated in FIGURES 4 and 5. In FIGURE 5 the joint pivot axis "$x$" is located approximately at the intersection of the pitch circle "$p$" of the joint members, for example. In FIGURE 4, the joint pivot axis "$x$" is located approximately half way between the joint rotational axes and the outer edges of the pitch circles.

The point or points of engagement of the drive teeth 26 and 28 of the joint members, which determine the pitch circles "$p$," may be referred to as the pitch point or pitch points. These pitch points constitute centros which do not move with respect to the joint rotational axis as the members are rotated, so that the length of the drive moment arm does not vary. Accordingly, the members are so constructed that the teeth obey the law of gearing for providing constant velocity drive between the members. It will be recognized that the pivot axis "$x$" intersects the pitch circles at the pitch points.

While from the standpoint of theory the teeth engage only at the pitch points, in practice the engagement occurs in an area or areas with the resultant engagement forces acting at these pitch points. Furthermore, several teeth may be in engagement at the same time to thus increase the load carrying capacity, but the tooth configuration is such that the engagement forces are resolved at the pitch points for all practical purposes.

In order to prevent interference between the ends of the teeth on one member and the bottom lands between engaging teeth on the other member, clearance spaces 42 are provided between the ends of the external teeth 26 and the bottom lands between the internal teeth 28, and clearance spaces 44 are provided between the ends of the internal teeth 28 and the bottom lands between the external teeth 26 (FIGURES 3 and 14). These clearances are just sufficient to prevent interference during operation of the joint at any angle in the design range for the desired location of the joint pivot axis "$x$." If the joint is constructed with the pivot axis "$x$" close to the outer edges of the pitch circles as shown in FIGURE 5, it is desirable to form the ends of the external teeth 26 and the internal teeth 28 on an arc as shown so that the required clearances 42 and 44 are not excessive.

In order to achieve constant velocity drive in the joint 20 at all angles up to maximum angle "$a$," each of the external drive teeth 26 is formed with four substantially flat drive faces 46 and each of the internal drive teeth 28 is formed with four substantially flat drive faces 48. Theoretically, these drive faces 46 and 48 are pairs of oppositely formed helical surfaces diverging axially in both directions from respective radial planes "$b$" which are centrally located with respect to the axial ends of the teeth of each member. In other words, the drive teeth 26 and 28 can be described as double helical teeth, each having opposite pairs of right hand and left hand helical gear tooth faces. The helical angles of the right hand and left hand faces are equal and opposite and the pairs of faces theoretically intersect at the radial planes "$b$." As a result the gear teeth are diamond shaped in plan view as seen in the figures. The helical angles of the teeth are equal to one half the maximum joint angle "$a$," or, in other words, each generating element of any one of the drive faces 46 or 48 defines an angle "$\frac{1}{2}a$" with respect to the axes of the respective member.

To strengthen the teeth and a make them easier to form, they are preferably tapered toward their ends as best seen in FIGURES 8, 9 and 15. A meshing taper angle is used for both internal and external teeth so that the teeth are substantially complementary when engaged.

The height or radial length of the teeth is determined by strength considerations in accordance with standard gear practice.

Figure 10:
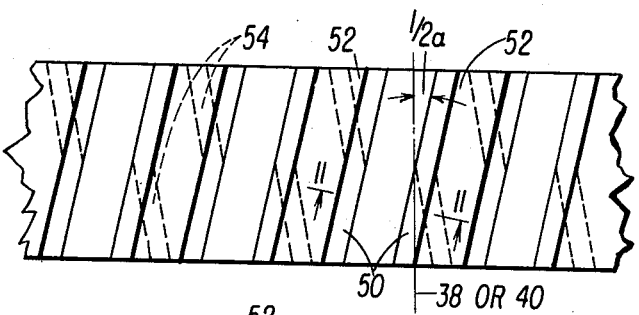
FIGURE 10 is a further enlarged linearly developed view of a portion of a partially formed joint member according to the present invention showing the additional portions to be formed by dotted lines.
Figure 11:
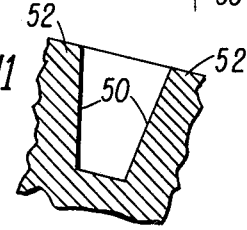
FIGURE 11 is a fragmentary sectional view taken along lines 11—11 of FIGURE 10.

To better illustrate the configuration and method of formation of the teeth, reference is made to FIGURES 10 and 11. FIGURE 10 is a linearly developed view of a portion of either the drive or the driven member showing the drive teeth when partly formed, and FIGURE 11 is a fragmentary sectional view showing the configuration of the grooves between the adjacent teeth. As illustrated in these figures, opposed right hand helical gear faces 50 have been cut or otherwise formed about the periphery of the member leaving right hand helical gear teeth 52 formed about the member's periphery. Subsequently, left hand helical gear faces 54 are cut or otherwise formed on the same gear teeth as illustrated in dotted lines. The left hand helical gear faces 54 are formed at the same helical angle and with the same angular relationship between opposed faces as is the case with the first formed right hand helical faces 50. The gear pitch of the subsequently formed faces is the same as the gear pitch of the first formed faces 50. The indexing is such that the faces, when formed, intersect in a plane located axially midway between the axial ends of the teeth. Thus, double helical gear teeth are formed as shown in the other figures.

The double helical gear teeth of the joint members may be readily formed on a standard gear cutting machine for example, by first cutting right or left hand helical gear teeth and then cutting the same teeth on the opposite helical angle.

While the drive faces 46 and 48 of the drive teeth are theoretically helical or spiral, from a practical standpoint they may be formed as flat surfaces or substantially flat surfaces approximating the corresponding theoretical helixes. This is ordinarily permissible because the teeth are necessarily axially short since their axial length is limited by the helix angle, with a greater angle resulting in axially shorter teeth for the same tooth thickness.

In order to closely control the location of the pitch circle "p" the drive faces 46 and 48 of the teeth may be slightly "crowned" in their profile as best seen in FIGURE 15. Theoretically, the crowned teeth contact at a single point or on a single line, but in actual practice a considerable area is in contact due to the inherent resiliency of the materials. The effect of the crowning is to insure that the resultant force between adjacent teeth is transmitted at the pitch line. The crowning also accommodates slight dimensional differences occasioned by necessary manufacturing tolerances and enhances the smoothness of operation.

Referring to FIGURE 14, it will be seen that the juncture between adjacent right and left hand helical faces 46 or 48 at the radial planes "b" is not a sharp edge. Instead, an arcuate surface 56 forms the juncture between the adjacent helical faces 46, and an arcuate surface 58 forms the juncture between the adjacent helical faces 48. These arcuate surfaces are of substantially frusto-conical configuration with the conical diameter varying as the thickness of the tooth at the plane "b." In other words, the conical diameter "$d_r$" at the root of the tooth is equal to the thickness at the root while the conical diameter "$d_t$" at the tip is equal to the thickness at the tip. It will be noted from FIGURE 15, however, that conical juncture surfaces 56 and 58 are also slightly crowned in profile in order to conform with the crowning of the drive faces 46 and 48.

The spacing between adjacent teeth is substantially equal to the thickness of the meshing teeth. In other words, then, the distance between adjacent teeth at the pitch line is substantially equal to the tooth thickness at the pitch line, inasmuch as the teeth 46 and 48 are of complementary configuration. To accommodate manufacturing tolerances and to provide some running tolerance, however, a slight working clearance, one thousandth of an inch, for example, may be provided between meshing teeth at the pitch line.

It will be noted that corresponding generating elements of the right hand or the left hand faces of each tooth 26 and 28 are substantially parallel and are spaced apart the same distance as the corresponding radius of the conical juncture surfaces 56 or 58. The result is that the working clearance between adjacent meshing teeth is always the same regardless of the angle between the joint rotational axes 38 and 40, up to the maximum angle "$a$."

Figure 12:
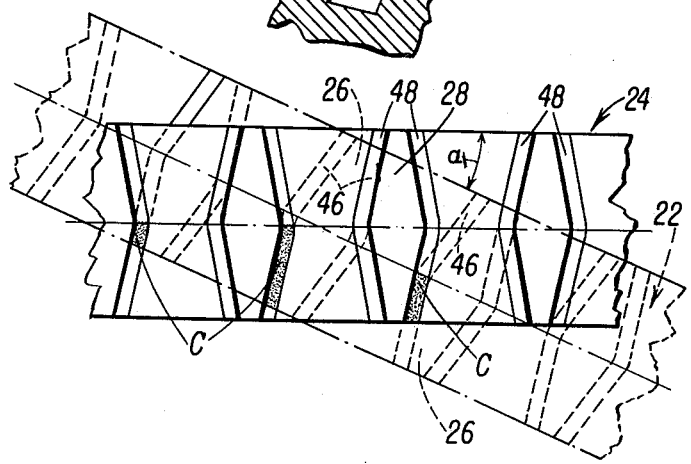
FIGURE 12 is a linearly developed fragmentary view showing the sequence of the engagement of the teeth of a joint according to the present invention at maximum displacement angle, on the same scale as FIGURE 9.
Figure 13:
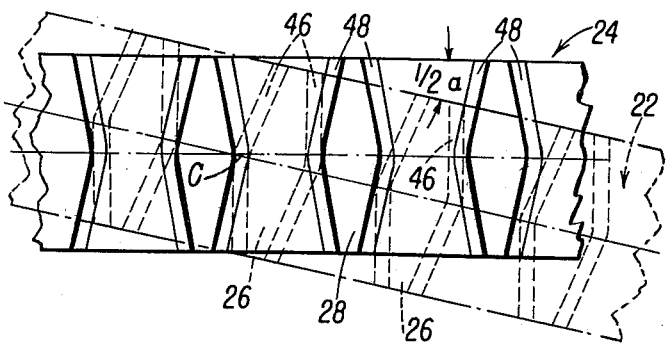
FIGURE 13 is a linearly developed fragmentary view showing the sequence of engagement of the teeth of a joint of this invention at an angle less than the maximum angle, on the same scale as FIGURE 10.

FIGURES 12, 13 and 16 best illustrate the action of the meshing teeth as they engage one another. FIGURE 12 illustrates the engagement at maximum joint angularity "$a$" showing that, but for the crowning of the teeth, full surface contact would be obtained between engaging drive faces 46 and 48 of respective teeth. Since the drive faces are actually crowned, engagement occurs on a more limited area adjacent the pitch circle, but for purposes of illustration, engagement areas "c" are shaded in FIGURE 12 as though the faces were not crowned. It will be noted that initial engagement at maximum angle occurs as soon as the respective surfaces 46 and 48 come adjacent one another, and the surface in contact increases as the meshing teeth move toward each other. As they begin to recede from one another, the engagement surface decreases until they disengage as the axial end of one tooth passes the arcuate juncture surface of the meshing tooth.

At less than maximum joint angle, the tooth contact occurs theoretically only at the juncture surfaces 56 and 58. This is because the teeth move relative to each other at the particular operational angle of the joint while the drive faces 46 and 48 are formed for full surface contact at the maximum angle. Due to the inherent resiliency of the materials, however, there is no sudden change from full surface contact at maximum angle to point contact at less than maximum angle. Actually, the area of contact between adjacent teeth decreases and moves toward the juncture surfaces 56 and 58 as the joint angle is decreased. At the same time, however, as the joint angle is decreased, the number of teeth in simultaneous engagement is increased. For example, at maximum angle, there may be only two or three teeth in simultaneous engagement while at zero angle, all teeth are simultaneously engaged.

Full engagement at less than maximum angle occurs as the arcuate juncture surfaces 56 and 58 of adjacent teeth cross each other. This is best illustrated in FIGURES 13 and 16 which show a typical joint operating at approximately ½ the maximum angle. In this instance, contact theoretically occurs at a point between engaging teeth with the resultant force acting at the pitch line. Practically, however, surface engagement occurs because of the inherent resiliency of the materials, and the surface engagement area increases as the joint angle increases. As a result, at the smaller angles more teeth are in engagement but the surface engagement area per tooth is less. Conversely, at the larger angles, fewer teeth are in engagement but the surface engagement area per tooth is greater. This inherent compromise between surface of engagement and number of teeth in engagement results in a load carrying capacity at maximum angle which is substantially equal to the load carrying capacity at zero angle.

In some applications where relatively light loads are carried by the joint, the drive teeth of one of the joint members 22 or 24 can be made in frusto-conical form. In other words, the teeth of one member can be formed as frusto-conical pegs having conical radii corresponding to the radii of the arcuate surfaces 56 or 58. A top view of such a conical peg tooth is illustrated in dotted lines in FIGURE 14. Such a joint, utilizing conical peg teeth on one of the joint members, operates in substantially the same manner as a joint utilizing double helical teeth on both members except that full surface contact is never achieved. Therefore, the load carrying capacity of such a modified joint is somewhat less at maximum joint angle, and the strength of the peg teeth is somewhat less.

In essence, it will be understood that the joint of the present invention is provided with drive and driven members having engaging teeth which are formed so that the distance or clearance between the adjacent teeth is always substantially equal regardless of the angularity between the rotational axes of the members up to the maximum angle. This insures that the meshing teeth may slip between each other as the joint rotates with exactly the same working clearance regardless of joint angularity. Thus, relative movement between engaging teeth is always in a straight line or, theoretically, on a given helix. Furthermore, the teeth are so formed that the resultant drive force acts at a fixed pitch diameter. The result is absolutely constant velocity drive at all angles up to maximum without any tooth interference and with a load carrying capacity which remains generally constant.

Variations and modifications may be effected without departing from the spirit or scope of the novel concepts of the invention.

I claim:

1. A constant velocity universal joint comprising a drive member, a driven member, and complementary engaging gear teeth on said members in meshing engagement, said gear teeth being formed to maintain a given working clearance between adjacent teeth of the respective members regardless of the angularity between the rotational axes of the members up to a predetermined maximum angle.

2. In a constant velocity universal joint including a drive member and a driven member adapted for rotation with their axes angularly disposed at any angle up to a predetermined maximum angle, the improvement comprising circumferentially spaced gear teeth formed on each of said members, said teeth having drive faces formed to maintain a given working clearance between adjacent teeth of the respective members when the teeth are in meshing engagement regardless of the angularity between the rotational axes of the members up to said predetermined maximum angle.

3. A constant velocity universal joint according to claim 2 wherein said drive faces are substantially helical.

4. In a constant velocity universal joint including a drive member and a driven member adapted for rotation with their axes angularly disposed at any angle up to a predetermined maximum angle, the improvement comprising circumferentially spaced gear teeth formed on each of said members and adapted for meshing with effective drive contact at a predetermined pitch diameter, said teeth having complementary drive faces formed to maintain a given working clearance between adjacent teeth of the respective members when the teeth are in meshing engagement regardless of the angularity between the rotational axes of the members up to said predetermined maximum angle.

5. A constant velocity universal joint according to claim 4 wherein said axes are adapted for pivoting with respect to each other about a pivot axis intersecting the plane determined by said axes at any predetermined position on a line in said plane between the point of intersection of the axes and a point at the pitch diameter.

6. A constant velocity universal joint comprising a first member having external gear teeth, and a second member having internal gear teeth meshing with the external gear teeth of said first member, said teeth having complementary profiles formed such that effective engagement pressures are transmitted through at least one stationary pitch point at a given distance from the rotational axes of both members regardless of the angularity between the rotational axes up to a predetermined maximum angle.

7. A constant velocity universal joint according to claim 6 wherein said profiles are substantially helical.

8. A constant velocity universal joint comprising a first member having external gear teeth, and a second member having internal gear teeth meshing with the external gear teeth of said first member, said teeth having profiles formed such that a given working clearance is maintained between the meshing teeth of the respective members regardless of the angularity between the rotational axes of the members up to a predetermined maximum angle.

9. A constant velocity universal joint comprising a first member having external gear teeth, and a second member having internal gear teeth meshing with the external gear teeth of said first member, said teeth having profiles formed such that the meshing teeth move on a substantially straight line relative to each other while maintaining a given working clearance between the meshing teeth of the respective members regardless of the angularity between the rotational axes of the members up to a predetermined maximum angle.

10. A constant velocity universal joint comprising a drive member and a driven member, one of said members having external gear teeth, and the other of said members having internal gear teeth adapted for meshing with the external gear teeth of said one member, each of said gear teeth of both of said members having symmetrically formed right hand and left hand helical gear tooth faces on each side with the helical angles being equal and opposite.

11. A constant velocity universal joint comprising a drive member and a driven member adapted for rotation with their axes angularly disposed, one of said members having double helical external gear teeth, and the other of said members having double helical internal gear teeth adapted for meshing with the external gear teeth of said one member, and means pivotally associating said members for changing the angle between their axes by pivoting about a pivot axis intersecting the plane determined by said axes at any predetermined position on a line in said plane between the point of intersection of the axes and a point where the teeth of one of the members cross said plane.

12. A constant velocity universal joint comprising a drive member and a driven member adapted for rotation with their axes angularly disposed at any angle up to a predetermined maximum angle, one of said members having double helical external gear teeth, and the other of said members having double helical internal gear teeth adapted for meshing with the external gear teeth of said one member, said teeth having complementary profiles formed such that effective engagement pressures are transmitted at predetermined pitch points at a given distance from the rotational axes of both members, said pitch points being symmetrically disposed on opposite sides of the plane determined by said axes.

13. A constant velocity universal joint comprising a drive member and a driven member adapted for rotation with their axes angularly disposed at any angle up to a predetermined maximum angle, one of said members having double helical external gear teeth with a given pitch circle, and the other of said members having double helical internal gear teeth with a given pitch circle and adapter for meshing with the external gear teeth of said one member, said teeth having complementary profiles formed such that effective engagement pressures are transmitted at the points of intersection of said pitch circles.

14. In a constant velocity universal joint including a drive member adapted for driving a driven member with the axes of the members at any angle up to a predetermined maximum drive angle, the improvement comprising external gear teeth on one of said members, and internal gear teeth on the other of said members adapted for meshing with the external teeth on said one member, said gear teeth of both of said members having faces of opposed teeth formed as substantially complementary helical surfaces diverging axially in both directions from a radial plane with the angle of divergence of each of the helical surfaces being equal to one-half the maximum drive angle between the shafts.

15. In a constant velocity universal joint including a drive member adapted for driving a driven member with the axes of the members at any angle up to a predetermined maximum drive angle, the improvement comprising external gear teeth on one of said members, and internal gear teeth on the other of said members adapted for meshing with the external teeth on said one member, said gear teeth of both of said members having faces of opposed teeth formed as substantially complementary helical surfaces diverging axially at equal angles in both directions from a radial plane, said faces being formed to maintain a given working clearance between adjacent teeth of the respective members when the teeth are in meshing engagement regardless of the angularity between the rotational axes of the members up to said maximum drive angle.

16. A constant velocity universal joint comprising a first member having gear teeth with symmetrically formed right hand and left hand helical gear tooth faces on each side of each tooth, a second member having internal drive teeth with symmetrically formed right hand and left hand helical gear tooth faces on each side of each tooth, and a juncture between adjacent right hand and left hand helical faces of each tooth formed as a substantially frusto-conical surface having a conical diameter varying as the thickness of the tooth.

17. A constant velocity universal joint comprising a first member having gear teeth with symmetrically formed right hand and left hand helical gear tooth faces on each side of each tooth, and a second member having internal drive teeth with symmetrically formed right hand and left hand helical gear tooth faces on each side of each tooth, said gear tooth faces of each of said members being slightly convexly crowned in profile from root to tip.

18. A constant velocity universal joint comprising a first member having gear teeth with symmetrically formed right hand and left hand helical gear tooth faces on each side of each tooth, a second member having internal drive teeth with symmetrically formed right hand and left hand helical gear tooth faces on each side of each tooth, and a juncture between adjacent right hand and left hand helical faces of each tooth formed as a substantially frusto-conical surface having a conical diameter varying as the thickness of the tooth, said gear tooth faces of each of said members being slightly crowned in profile from root to tip.

19. A constant velocity universal joint comprising a first member having gear teeth with symmetrically formed right hand and left hand helical gear tooth faces on each side of each tooth, a second member having internal drive teeth with symmetrically formed right hand and left hand helical gear tooth faces on each side of each tooth, and a juncture between adjacent right hand and left hand helical faces of each tooth formed as an arcuate surface, said gear tooth faces and said junctures forming gear tooth profiles providing a given working clearance between adjacent teeth of the respective members when the teeth are in meshing engagement at all angles up to the helical angle of said gear tooth faces.

References Cited in the file of this patent
UNITED STATES PATENTS

| | | |
|---|---|---|
| 1,891,285 | Loewns | Dec. 20, 1932 |
| 2,682,760 | Shenk | July 6, 1954 |
| 2,687,025 | Wildhaber | Aug. 24, 1954 |
| 2,841,966 | Belden et al. | July 8, 1958 |
| 2,922,294 | Wildhaber | Jan. 26, 1960 |